(12) United States Patent
Sclafani

(10) Patent No.: US 10,888,755 B2
(45) Date of Patent: Jan. 12, 2021

(54) METHOD FOR REDUCING VIBRATION IN CLUB SHAFT

(71) Applicant: Adam C. Sclafani, Lake Wylie, SC (US)

(72) Inventor: Adam C. Sclafani, Lake Wylie, SC (US)

(*) Notice: Subject to any disclaimer, the term of this patent is extended or adjusted under 35 U.S.C. 154(b) by 0 days.

(21) Appl. No.: 16/196,878

(22) Filed: Nov. 20, 2018

(65) Prior Publication Data

US 2019/0151731 A1    May 23, 2019

Related U.S. Application Data

(60) Provisional application No. 62/588,690, filed on Nov. 20, 2017.

(51) Int. Cl.
| | | |
|---|---|---|
| *A63B 53/12* | (2015.01) | |
| *A63B 53/10* | (2015.01) | |
| *A63B 60/54* | (2015.01) | |
| *A63B 53/00* | (2015.01) | |
| *B32B 5/18* | (2006.01) | |
| *C08G 101/00* | (2006.01) | |
| *A63B 60/00* | (2015.01) | |

(52) U.S. Cl.
CPC .............. *A63B 60/54* (2015.10); *A63B 53/00* (2013.01); *A63B 53/10* (2013.01); *A63B 60/002* (2020.08); *A63B 2209/00* (2013.01); *B32B 5/18* (2013.01); *C08G 2101/0008* (2013.01); *C08J 2325/06* (2013.01)

(58) Field of Classification Search
CPC ......... A63B 60/54; A63B 53/14; A63B 53/10; A63B 53/12; A63B 53/00; A63B 60/002; A63B 2209/00; C08J 2325/06; B32B 5/18; B32B 7/12; B32B 3/04; B32B 2307/718; B32B 2307/722; B32B 2266/0228; B32B 2307/56; B32B 2250/02; B32B 5/20; B32B 1/00; B32B 5/24; B32B 2266/0278; C08G 2101/0008
See application file for complete search history.

(56) References Cited

U.S. PATENT DOCUMENTS

| | | | | |
|---|---|---|---|---|
| 4,660,832 A * | 4/1987 | Shomo | ................... | A63B 49/08 16/431 |
| 5,141,684 A * | 8/1992 | Yoshimura | ......... | C08G 18/2036 264/45.5 |
| 5,290,036 A * | 3/1994 | Fenton | ................... | A63B 53/04 473/332 |
| 5,294,119 A * | 3/1994 | Vincent | ................... | A63B 53/10 473/318 |
| 5,607,364 A * | 3/1997 | Hedrick | ................ | A63B 53/10 473/318 |
| 5,655,975 A * | 8/1997 | Nashif | ................... | A63B 53/00 473/316 |
| 5,788,586 A * | 8/1998 | Macioce | ................ | A63B 53/00 473/318 |

(Continued)

*Primary Examiner* — Stephen L Blau
(74) *Attorney, Agent, or Firm* — Fay Sharpe LLP

(57) ABSTRACT

A golf club is disclosed having a shaft which reduces or dampens vibrations. A method for making the golf club is also disclosed. A cavity is centrally formed within the shaft and a viscoelastic material is disposed within the cavity. The viscoelastic material forms a network of elastic dampeners configured to attenuate propagation of vibrational energy through the shaft.

5 Claims, 4 Drawing Sheets

(56) References Cited

U.S. PATENT DOCUMENTS

| | | | |
|---|---|---|---|
| 6,354,958 B1 | 3/2002 | Meyer | |
| 6,641,489 B1 | 11/2003 | Wright et al. | |
| 6,902,495 B2 * | 6/2005 | Pergande | A63B 53/047 |
| | | | 473/332 |
| 6,974,626 B2 * | 12/2005 | Horacek | A63B 49/08 |
| | | | 428/354 |
| 10,387,930 B2 * | 8/2019 | Thurman | A63B 59/50 |
| 2001/0005696 A1 * | 6/2001 | Hedrick | A63B 53/00 |
| | | | 473/318 |
| 2003/0092502 A1 * | 5/2003 | Pergande | A63B 53/047 |
| | | | 473/332 |
| 2005/0137026 A1 * | 6/2005 | Stites | A63B 53/00 |
| | | | 473/318 |
| 2006/0194643 A1 * | 8/2006 | Chen | A63B 53/10 |
| | | | 473/318 |
| 2012/0190475 A1 | 7/2012 | Kfuri et al. | |
| 2013/0318772 A1 * | 12/2013 | Wahl | B23P 17/04 |
| | | | 29/530 |
| 2014/0206471 A1 * | 7/2014 | Jertson | A63B 53/14 |
| | | | 473/300 |
| 2017/0014695 A1 * | 1/2017 | Chen | A63B 60/48 |
| 2017/0333765 A1 * | 11/2017 | Parsons | A63B 53/047 |
| 2018/0185717 A1 * | 7/2018 | Demkowski | A63B 53/047 |
| 2019/0314694 A1 * | 10/2019 | Aumann | A63B 60/54 |

* cited by examiner

METHOD FOR REDUCING VIBRATION IN CLUB SHAFT

CROSS-REFERENCE TO RELATED APPLICATION

This application claims priority to U.S. Provisional Patent Application Ser. No. 62/588,690, filed Nov. 20, 2017, the entirety of which is fully incorporated herein by reference.

BACKGROUND OF THE DISCLOSURE

This disclosure relates to golf clubs and related sports applications. More particularly, it relates to reducing vibration in a golf club and, more specifically, in its shaft. The disclosure concerns the golf club shaft, as well as the club itself. Although a preferred embodiment of the present disclosure is directed to a golf club shaft, it is contemplated that other types of sports equipment (e.g., baseball bats, hockey sticks, etc., and the like) may similarly benefit from the vibration damping feature(s) disclosed herein.

During the game of golf, the golfer strikes the golf ball with a golf club, which includes a shaft, and which incorporates a head at its lower end, and a handle or grip at its upper end.

To drive the ball into the hole, the golfer uses several types of clubs (i.e., woods and irons) distinguished by the shapes of their heads used to strike the ball and by the length of their shafts. The impact of the ball on the hitting surface of the club head generates vibration in the shaft, which can prove especially unpleasant for the golfer. After the vibration generating impact with the ball, the golfer feels discomfort which can cause a loss of confidence in the club for the next hit.

Vibrations in a golf club, especially in its shaft, represent the sum of several vibration phenomena, or modes, whose frequencies can range anywhere between 0 and 200 Hertz or more. The frequency values primarily depend on the properties of the shaft and head, as well as on the nature of the boundary conditions (site and gripping intensity). All these vibrations are felt by the golfer as a disagreeable sensation upon impact, and they thus lessen the confidence the golfer has in the equipment, since he anticipates these unpleasant sensations before hitting the ball.

Different means for reducing vibration amplitudes are known in the art. Complete elimination or attenuation of bad vibrations deprives the golfer of information feedback. In fact, some manufacturers have incorporated, along the entire length of the shaft and in the structure, fibers, e.g., made of Kelvar, which in the context of use, exhibit well-known damping properties so as to reduce energy and thus the amplitudes of the vibrations; however, damping is not selective and, accordingly, the club damps all modes.

Thus, there is a need for a method for reducing vibration in a golf club shaft that results in an improved "feel" for the golfer using the golf club that overcomes the above-mentioned difficulties and others while providing better overall results.

SUMMARY OF THE DISCLOSURE

The present disclosure seeks to solve the problems of golf clubs according to prior art, by proposing a method to damp vibrations selectively in the golf club, and the amount of damping of each mode of vibration by injecting a material into a cavity in the club shaft.

In accordance with one embodiment of the disclosure, a golf club is described which includes a head having a club face and a shaft connected to the head. A cavity is centrally formed within the shaft and extends along a longitudinal axis thereof. A viscoelastic material is disposed within the cavity. The viscoelastic material forms a network of elastic dampeners configured to attenuate propagation of vibrational energy through the shaft.

In accordance with one aspect of the embodiment, the viscoelastic material substantially fills the cavity along one or more longitudinal length segments of the shaft. The viscoelastic material can substantially fill the cavity of the shaft along a total longitudinal length of the shaft. Moreover, the viscoelastic material can substantially fill some of the one or more longitudinal length segments of the shaft and the other one or more longitudinal segments are not filled. More particularly, the viscoelastic material can be disposed within at least one of a lower section of the shaft, an upper section of the shaft, and a middle section of the shaft. The viscoelastic material can be a viscoelastic foam, such as polystyrene, or a two-part cured soft urethane foam. The viscoelastic foam adds no more than about 8 grams to the shaft, and the two-part cured soft urethane foam adds no more than about 8 to 10 grams to the shaft.

According to another aspect of the embodiment, the viscoelastic material adheres to an internal surface of the cavity. In addition, or alternatively, an adhesive layer can be interposed between the viscoelastic material and an internal surface of the cavity. In accordance with other aspects of the embodiment, the shaft has an inner diameter and an outer diameter, and an outer dimension of the viscoelastic material coincides with the inner diameter of the shaft.

In accordance with a second embodiment of the disclosure, a golf club is described which includes a head having a club face and a shaft connected to the head. The shaft has an annular cross-section with an inner and an outer diameter. A cavity is defined by the inner diameter of the shaft and extends along a longitudinal axis thereof. A vibration dampening material is disposed in the cavity along one or more longitudinal length segments of the shaft. The vibration dampening material forms a network of elastic dampeners configured to attenuate propagation of vibrational energy through the shaft. Moreover, voids of vibration dampening material are substantially absent from the cavity at the one or more longitudinal length segments having vibration dampening material disposed therein.

In accordance with one aspect of the second embodiment, voids of vibration dampening material are substantially absent from the cavity along a total longitudinal length of the shaft. Alternatively, voids of vibration dampening material are substantially absent from the cavity along some of the one or more longitudinal length segments of the shaft and the other one or more longitudinal length segments are empty. The vibration dampening material is selected from at least one of a viscoelastic foam and a two-part cured soft urethane foam.

In accordance with another aspect of the embodiment, there are several (such as three) segments of the shaft filled with foam, and several (such as two) segments of the shaft which are empty and are interposed between the foam filled segments. The foam segments may be formed from one or more types of foam such as polyurethane foam or polystyrene foam. The foams can be formed of various density foam, such as a low density foam near the bottom end of the shaft and higher density foams near the upper end of the shaft. That is, the foam density can continuously increase along the length of the shaft. This helps reduce the overall weight of the shaft.

In accordance with a third embodiment of the disclosure, a method of making a golf club is disclosed. The method includes the steps of providing a shaft having a centrally formed cavity extending along a longitudinal axis of the shaft; substantially filling the cavity with a viscoelastic material along one or more longitudinal length segments of the shaft; and, allowing the viscoelastic material to rest and adhere to an internal surface of the cavity along the one or more longitudinal length segments of the shaft, wherein the viscoelastic material forms a network of elastic dampeners configured to attenuate a propagation of vibrational energy through the shaft.

In accordance with one aspect of the third embodiment, the method further includes substantially filling the cavity with the viscoelastic material along a total longitudinal length of the shaft. Alternatively, the method includes substantially filling the cavity with the viscoelastic material along some of the one or more longitudinal length segments of the shaft and not others.

According to other aspects of the embodiments disclosed herein, the vibration dampening material that is filled into the shaft is of low weight and retain flexibility. Such a material can be viscoelastic foam such as polystyrene or a two-part cured soft urethane foam, both of which are very effective at reducing vibration. The vibration dampening material is very light weight and only adds about 5 to 12 grams, including about 8 grams, of weight to the shaft.

Another aspect of the presently disclosed embodiments is that the golf club shaft itself is substantially hollow. The vibration dampening material, such as a two-part urethane or polystyrene foam, is poured into the opening of the shaft and bubbles up and fills the entirety of the shaft interior. Partial filling of the shaft with vibration dampening material is also contemplated by the embodiments. Partial fills may be desired if less weight of the shaft or targeted vibration dampening is needed or preferred.

In accordance with other aspects of the embodiments disclosed herein, the two-part urethane can be poured into the shaft of the present disclosure and cures with a closed cell structure and a low hardness (as measured with a durometer).

One key aspect of the embodiments of the disclosure is that the vibration dampening material stays flexible and does not rest, dry, or cure as a hard solid. The vibration dampening material, however, adheres to the inside of the shaft.

One aspect achieved by the embodiments disclosed herein is a difference in sound and resonance from by the vibration reduction shaft of the present disclosure as compared to a standard shaft without vibration reduction. In other words, the shaft does not show any sign of vibration when dropped on a surface, and the sound of the shaft hitting the surface is dampened. Thus, perceived value is added to the shaft when undergoing drop demonstrations.

Still another aspect achieved by the embodiments of the disclosure is the increase in smoothness when the club head contacts the ball. That is, the vibration is absorbed within the shaft and not transmitted through the shaft to a golfer's hands. As a result, golfer comfort is increased, and the "feel" that the golfer experiences when swinging the golf club is improved. Fatigue of the golfer is also reduced.

Still other aspects of the embodiments of the disclosure will become apparent upon a reading and understanding of the following detailed description.

BRIEF DESCRIPTION OF THE DRAWINGS

For a better understanding of the present disclosure, reference may be had to the following detailed description taken in conjunction with the accompanying drawings in which.

DETAILED DESCRIPTION OF THE DISCLOSURE

Figure 1:
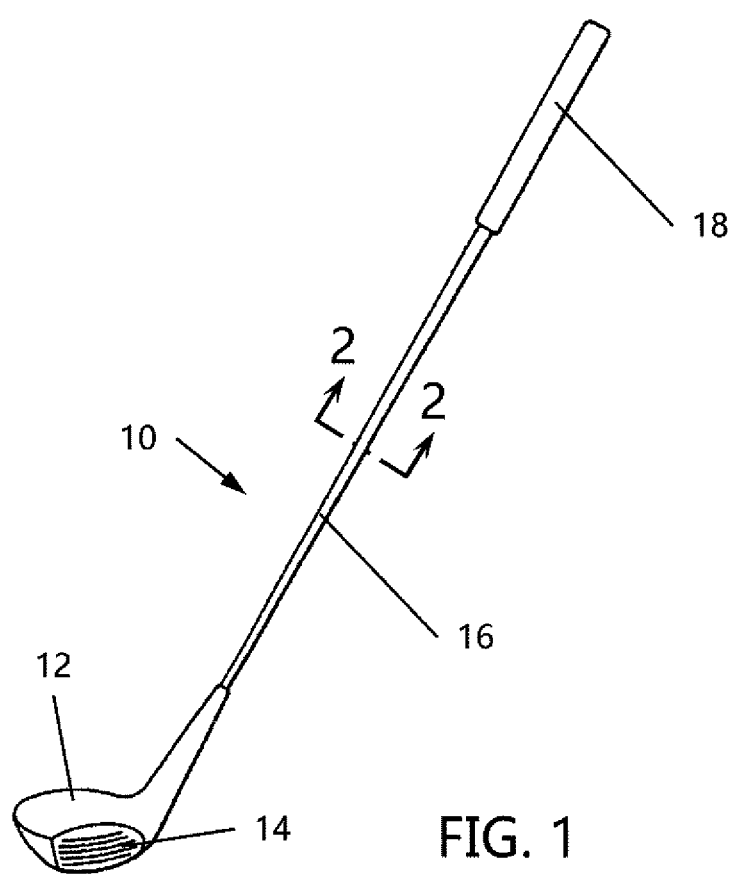
FIG. 1 is a perspective view of a golf club having a shaft with a vibration dampening or reduction material disposed therein in accordance with a preferred embodiment of the disclosure.

Referring to FIG. 1, a preferred embodiment of a golf club having a vibration damping feature, according to the present disclosure, is shown. A golf club 10 includes a golf head 12 having a club face 14 which is used to strike a stationary golf ball in the game of golf. While the club head 12 illustrated in FIG. 1 is of the type known as a driver or a "wood", it should be appreciated that the golf club could also be of any type of club, such as a "wedge", "iron" or a "putter".

The golf club 10 also includes a shaft 16 connected to the club head 12. The shaft 16 has a predetermined length and resonant frequencies over a predetermined range. The shaft 16 is hollow and may be manufactured from a variety of materials commonly known in the art. The shaft 16 has a grip 18 at its end opposite the club head 12 which is grasped by the golfer during play.

Figure 2:
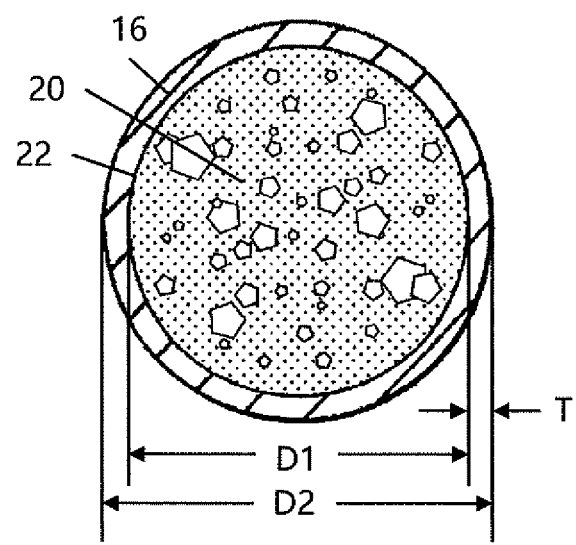
FIG. 2 is a cross-sectional view taken along lines 2-2 of FIG. 1.

With reference to FIG. 2, it should be appreciated that the shaft 16 itself is a one-piece tubular member. However, the shaft 16 could also be formed of multiple tubular pieces. The shaft 16 has an annular cross-section with inner and outer diameters D1, D2. A thickness T of the shaft 16 is measured between D1 and D2. Generally, inner and outer diameters D1, D2 gradually decrease along a longitudinal length of shaft 16, with the largest values of D1 and D2 being adjacent the handle 18 and the lowest values of D1 and D2 being adjacent the club head 12. However, such a configuration is non-limiting. Moreover, it should be appreciated that thickness T can vary or remain substantially constant along the longitudinal length of the shaft 16 without departing from the scope of the present disclosure. Thus, a golf club shaft 16 is provided with a hollow internal portion or cavity 22 formed centrally within the shaft 16 and extending along the longitudinal axis thereof. Stated another way, a golf club shaft 16 is provided which has an annular cross-section, an outer diameter D2, and an inner diameter D1 which defines a hollow internal portion or cavity 22.

Figure 3:
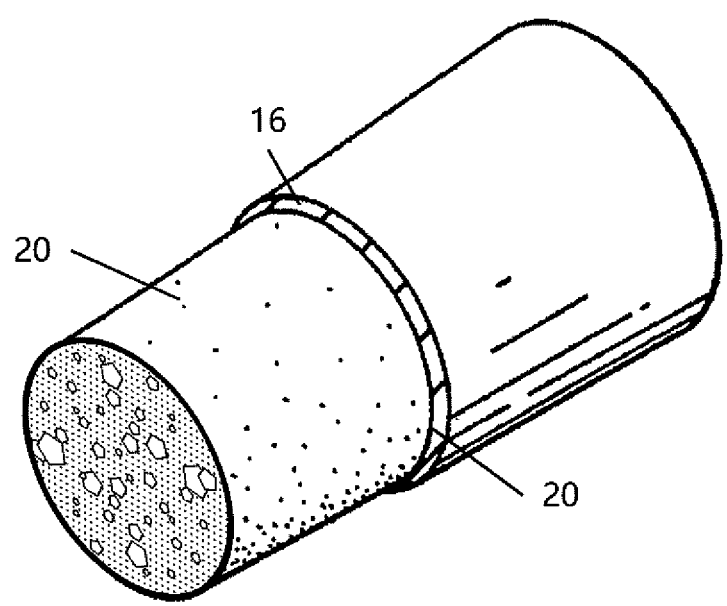
FIG. 3 is a partial fragmentary perspective view of a portion of the golf club having a shaft with the vibration dampening material of FIG. 1.

As illustrated in FIGS. 2 and 3, a viscoelastic material 20 is disposed within the cavity 22 of the shaft 16 and along one or more longitudinal length segments of the shaft. In other words, the viscoelastic material 20 is configured to substantially or entirely fill the hollow internal portion or cavity 22 along a desired longitudinal length of the shaft. In some embodiments, the viscoelastic material 20 substantially or entirely fills the entire cavity 22 along the total longitudinal length of the shaft 16. However, it is also contemplated that the viscoelastic material 20 substantially or entirely fills the cavity 22 only along some longitudinal length segments of the shaft 16, with other longitudinal length segments being empty (i.e., free of viscoelastic material). In such embodiments, the shaft cavity can be considered "partially filled", since the total longitudinal length of the shaft is not filled with viscoelastic material. However, in partially filled embodiments, it should be understood that the viscoelastic material still substantially or entirely fills the cavity along the corresponding longitudinal length segment where viscoelastic material is desired. In this regard, an outer dimension or diameter of the viscoelastic material 20 generally coincides with the inner diameter D1 of the shaft 16.

In accordance with another aspect of the embodiment, there are several (such as three) segments of the shaft 16 which have cavities 22 filled with the viscoelastic material 20, and several (such as two) segments of the shaft which are empty cavities 22 and are interposed between the foam filled segments. The foam segments may be formed from one or more types of foam such as polyurethane foam or polystyrene foam. The foams can be formed of various density foam, such as a low density foam near the bottom end of the shaft and higher density foams near the upper end of the shaft. That is, the foam density can continuously increase along the length of the shaft. This helps reduce the overall weight of the shaft.

The exemplary viscoelastic material 20 of the present disclosure is low weight, flexible, and acts to reduce vibration in the golf club shaft 16. Moreover, exemplary golf clubs including the viscoelastic material 20 emit a different sound and resonance in response to a vibration event than that of a standard golf club shaft. In some embodiments, the viscoelastic material 20 has intrinsic characteristics which allow adhesion to the internal surface of the cavity 22. However, in other embodiments, an adhesive layer (not shown) interposed between the viscoelastic material 20 and the internal surface of the cavity 22 can also be included to provide or enhance adhesion therebetween. Viscoelastic material can be polystyrene or polyurethane foam.

In some embodiments of the present disclosure, the viscoelastic material 20 is a viscoelastic foam. The viscoelastic foam is configured to substantially or entirely fill the hollow internal portion or cavity 22 of the golf club shaft 16, along either the entire longitudinal length of the shaft or along only some longitudinal length segments. The exemplary viscoelastic foam 20 is initially poured or injected into the cavity 22 as a liquid or semi-liquid, bubbles up, expands to completely fill the cavity. The viscoelastic foam 20 is allowed to rest or dry over time, if necessary, and thereafter bonds/adheres to the internal surface of the cavity. The bonded foam cells of the viscoelastic foam 20 form a network of elastic dampeners that attenuate the propagation of vibrational energy through the shaft wall. That is, vibration in the golf club shaft 16 is reduced. The expanded viscoelastic foam is low weight and flexible. For example, the expanded viscoelastic foam adds no more than about 5 to 10 grams of weight to the shaft. In some particular embodiments, the expanded viscoelastic foam adds no more than about 8 grams of weight to the shaft. Such an exemplary low weight is advantageously unnoticeable to most golfers. In particular embodiments, the viscoelastic foam 20 is polystyrene.

Use of expanded foam for the viscoelastic material 20, such as in the aforementioned exemplary embodiments, results in an increased smoothness when the club head 12 contacts an associated golf ball. That is, the viscoelastic foam causes vibration to be absorbed within the shaft instead of being transmitted through the shaft to the golfer's hands. As such, the "feel" of the club is improved, golfer comfort is increased, and golfer fatigue is reduced. Moreover, the shaft does not show any sign of vibration and emits less sound when dropped, thus adding perceived value to the shaft during demonstrations, for example.

In other particular embodiments, the viscoelastic material 20 is a two-part cured soft urethane foam. The two-part cured soft urethane foam is configured to substantially or entirely fill the hollow internal portion or cavity 22 of the golf club shaft 16, along either the entire longitudinal length of the shaft or along only some longitudinal length segments. The exemplary viscoelastic urethane material is initially poured or injected as a liquid or semi-liquid into the cavity 22, bubbles up and fills the entirety of the shaft interior. The viscoelastic urethane material 20 is allowed to rest or cure over time, thereafter bonding or adhering to the internal surface of the cavity.

One key aspect of the exemplary viscoelastic urethane is that flexibility is retained as the material cures. That is, the material cures soft, not as a hard solid, but still adheres to the inside of the shaft. The exemplary two-part urethane also cures with closed cell structure and a low hardness (as measured with a durometer). The bonded foam cells of the viscoelastic two-part cured soft urethane foam 20 form a network of elastic dampeners that attenuate the propagation of vibrational energy through the shaft wall. That is, vibration in the golf club shaft 16 is reduced. Moreover, the exemplary cured two-part soft urethane foam is low weight and flexible. For example, the cured two-part soft urethane foam adds no more than about 5 to 12 grams of weight, including about 8 to 10 grams. Such an exemplary low weight is advantageously unnoticeable to most golfers.

Use of a two-part cured soft urethane foam for the viscoelastic material 20, such as in the aforementioned exemplary embodiments, also results in an increased smoothness when the club head 12 contacts an associated golf ball, since vibration is absorbed within the shaft instead of being transmitted through the shaft to the golfer's hands. As a result, the "feel" of the club is improved, golfer comfort is increased, and golfer fatigue is reduced. Moreover, the shaft does not show any sign of vibration and emits less sound when dropped, thus adding perceived value to the shaft during demonstrations, for example.

Figure 4:
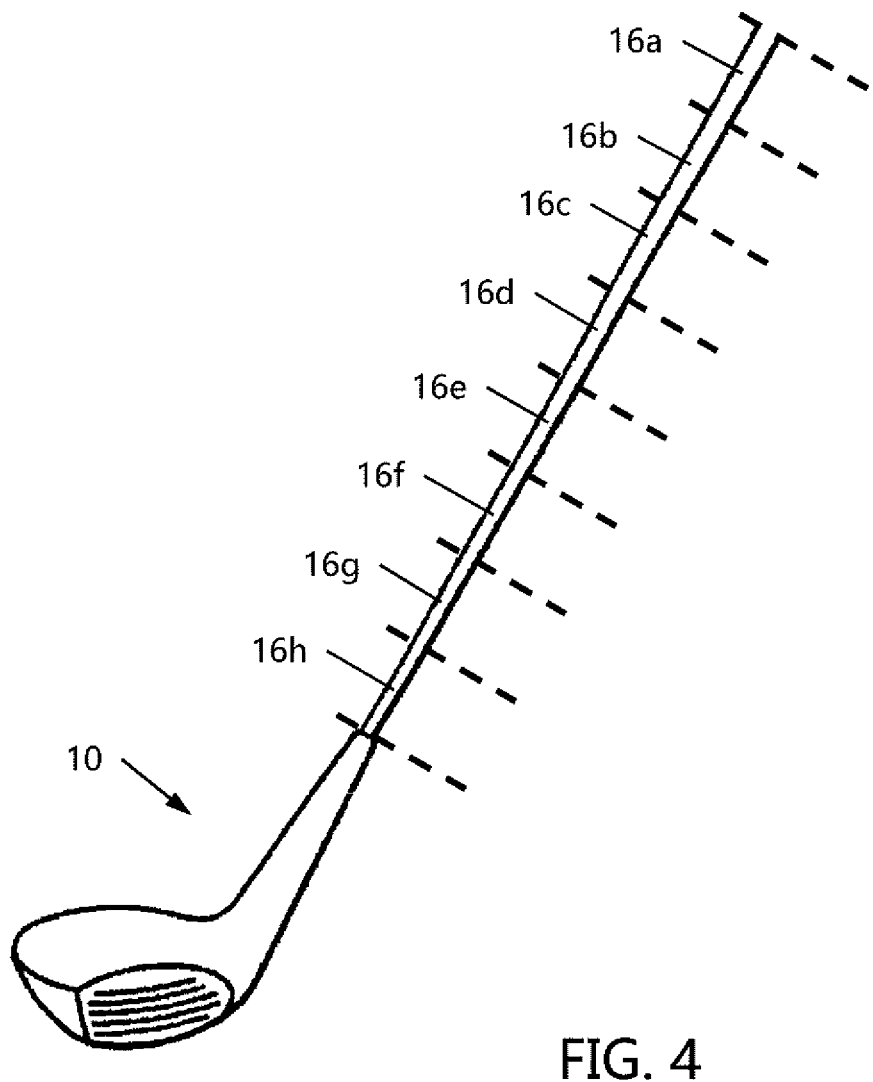
FIG. 4 is a perspective view of the golf club having a shaft with the vibration reduction material of FIG. 1 and being separated into eight longitudinal length segments.

With reference to FIG. 4, the golf club 10 is illustrated with dashed lines that separate the shaft 16 into eight (8) segments or cross sections 16A-16H. The dashes are indicative of exemplary cut lines where the shaft may be cut into the separate shaft segments 16A-16H. The separate shaft segments 16A-16H are further illustrated in FIGS. 5A-5D to show various embodiments of the vibration reducing golf club shaft. More particularly, segments 16A-16H in each of FIGS. 5A-5D are shown with their respective cavities 22A-22H being either partially or substantially entirely filled with viscoelastic material 20 for vibration dampening. In this regard, full or partial fills of golf shaft cavities with the exemplary viscoelastic material are contemplated by the present disclosure. Partial filling of the golf shaft cavity may be desired, for example, if less weight or selective vibration dampening is needed or preferred. Moreover, while FIG. 4 and FIGS. 5A-5D show the golf club shaft being separated into 8 equally sized segments, this number is only exemplary and was chosen to adequately illustrate various golf club shaft embodiments that are partially or substantially entirely filled with viscoelastic material.

Figure 5A:
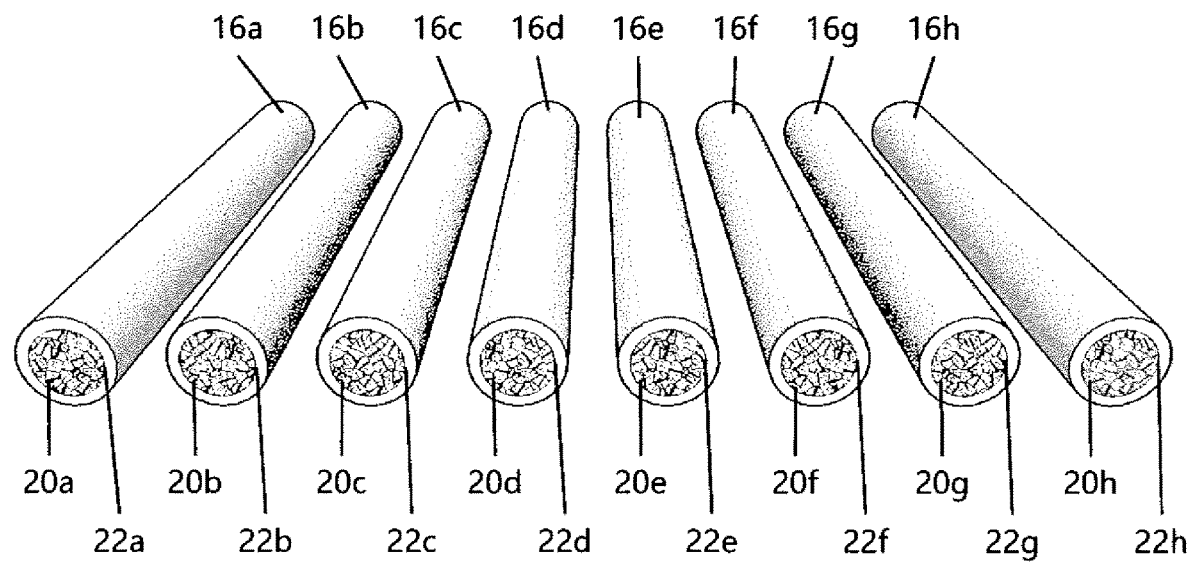
FIG. 5A is a perspective view of the eight longitudinal length segments from the golf club shaft of FIG. 4 being shown in cross-section, where each of the segments are substantially filled with the vibration dampening material.

FIG. 5A illustrates an exemplary golf club shaft with vibration dampening where substantially the entire shaft is filled with viscoelastic material. More particularly, each cross section 16A-16H shows an internal cavity 22A-22H being substantially filled with viscoelastic material 20A-20H. The 8 cross sectional segments show that the shaft in FIG. 5A is absent of any voids of viscoelastic material along its entire longitudinal length. Such a configuration is representative of a golf club shaft having a maximum level of vibration reduction.

Figure 5B:
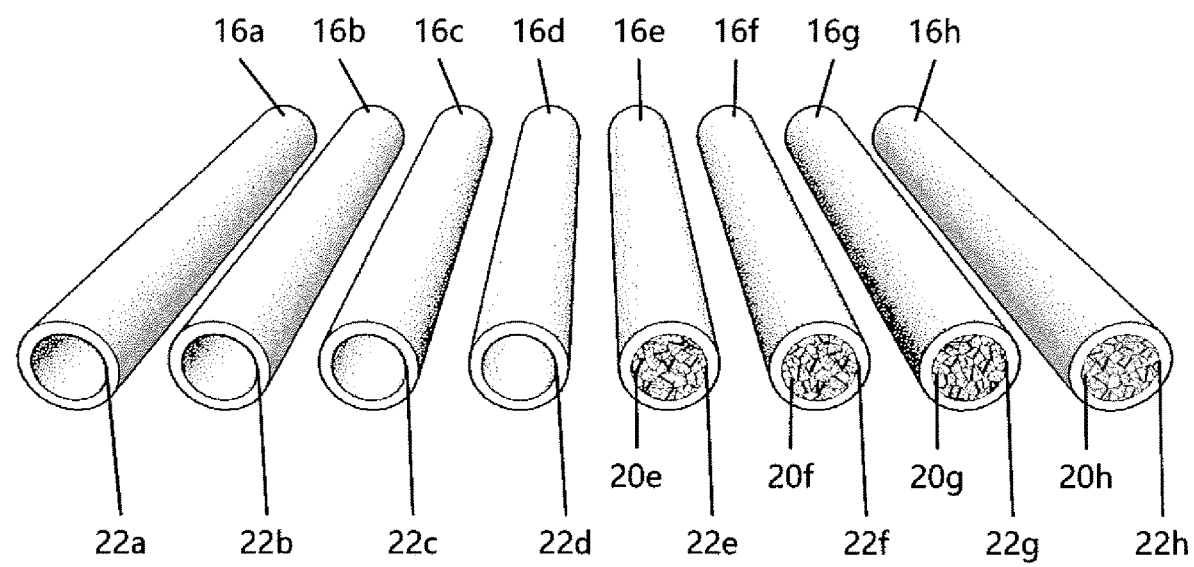
FIG. 5B is another perspective view of the eight longitudinal length segments from the golf club shaft of FIG. 4 being shown in cross-section, where a lower half of the segments are substantially filled with the vibration dampening material.

FIG. 5B illustrates an exemplary golf club shaft with vibration dampening where approximately half of the longitudinal length segments of the shaft are filled with viscoelastic material. In other words, the golf club shaft of FIG. 5B is partially filled. More particularly, lower cross-sectional segments 16E-16H (i.e., adjacent the head of the golf club) have an internal cavity 22E-22H being substantially filled with viscoelastic material 20E-20H, while upper cross-sectional segments 16A-16D (i.e., adjacent the handle of the golf club) are empty. Such a configuration is representative of a golf club shaft where targeted vibration reduction at the lower half of the club may be desired.

Figure 5C:
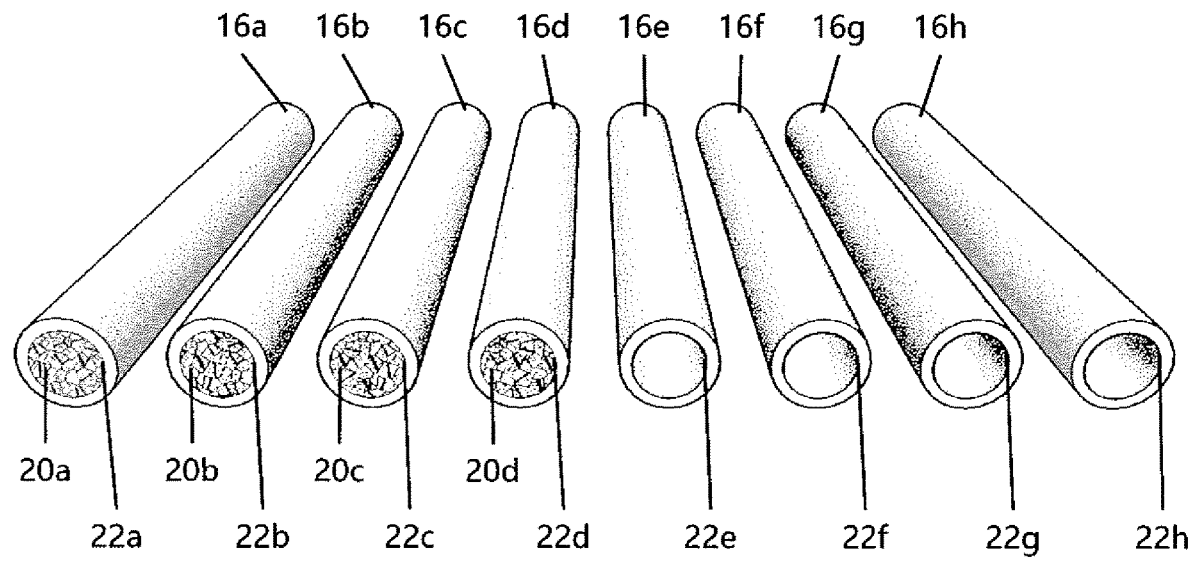
FIG. 5C is another perspective view of the eight longitudinal length segments from the golf club shaft of FIG. 4 being shown in cross-section, where an upper half of the segments are substantially filled with the vibration dampening material; and, FIG. 5D is another perspective view of the eight longitudinal length segments from the golf club shaft of FIG. 4 being shown in cross-section, where a lower portion, a middle portion, and an upper portion of the segments are substantially filled with the vibration dampening material.

FIG. 5C also illustrates an exemplary golf club shaft with vibration dampening where approximately half of the longitudinal length segments of the shaft are filled with viscoelastic material. In other words, the golf club shaft of FIG. 5C is partially filled. More particularly, upper cross-sectional segments 16A-16D have an internal cavity 22A-22D being substantially entirely filled with viscoelastic material 20A-20D, while lower cross-sectional segments 16E-16H are empty. Such a configuration is representative of a golf club shaft where targeted vibration reduction at the upper half of the club may be desired.

Figure 5D:
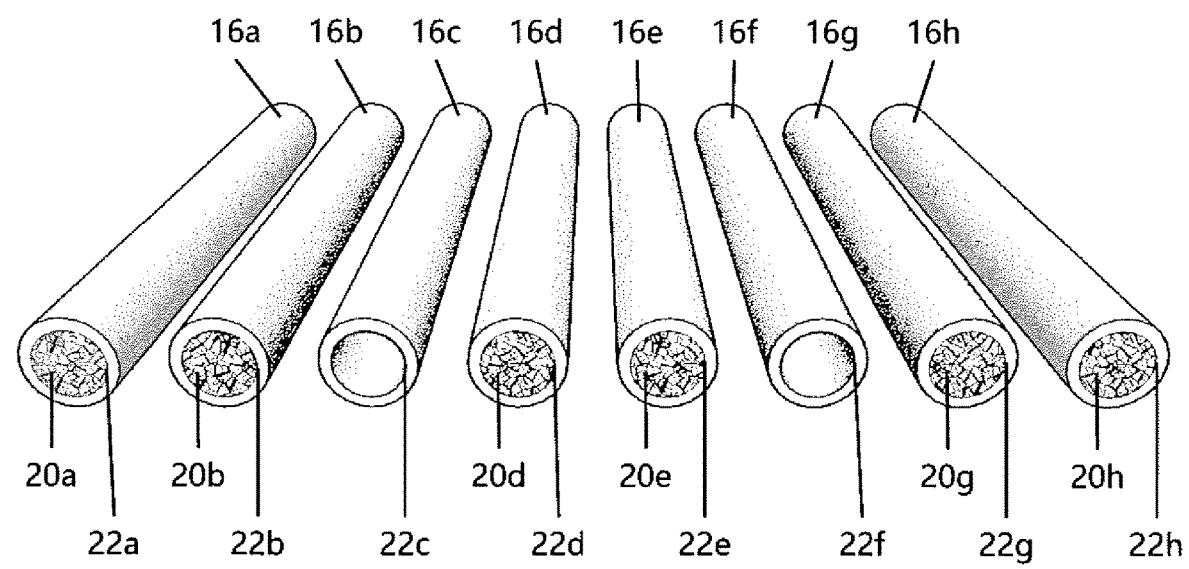

FIG. 5D illustrates an exemplary golf club shaft with vibration dampening where only some of the longitudinal length segments are filled with viscoelastic material. In other words, the golf club shaft of FIG. 5D is partially filled. More particularly, internal cavities 22A/22B of upper cross-sectional segments 16A/16B, internal cavities 22D/22E of middle cross-sectional segments 16D/16E, and internal cavities 22G/22H of lower cross-sectional segments 16G/16H are substantially filled with corresponding viscoelastic material 20A/20B, 20D/20E, and 22G/22H. The internal cavities 22C and 22F of intermediate cross-sectional segments 16C and 16F, respectively, are empty. Such a configuration is representative of a golf club shaft where a both a high level of vibration reduction and a lower weight is desired.

Moreover, while the partially filled golf club shafts in FIGS. 5C-5D are illustrated as having vibration dampening material disposed in specific locations (i.e., in specific longitudinal length segments or cross-sections), it should be understood that these locations are exemplary and non-limiting. That is, vibration dampening material can be disposed at any desired location within the golf club shaft without departing from the scope of the present disclosure.

Thus, in accordance with one aspect of the embodiments of the present disclosure, a method for reducing vibration of a golf club shaft, and the golf club shaft produced thereby, is provided. In accordance with another aspect of the embodiments of the disclosure, the material that is filled into the shaft is of low weight and retains flexibility. In a further aspect of the embodiments disclosed herein, a viscoelastic expanded foam is very effective at reducing vibration and is used as the filling material. In another aspect of the embodiments of the disclosure, a two-part cured soft urethane foam which is very effective at reducing vibration is used as the filling material. Another aspect of the embodiments of the disclosure is a difference in sound and resonance compared with standard golf club shafts, which adds perceived value to the shaft during demonstrations. An additional aspect of the embodiments of the disclosure is a shaft being substantially entirely filled or partially filled with viscoelastic material.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the above disclosures or the equivalents thereof.

The invention claimed is:

1. A method of making a golf club shaft comprising the steps of:
   providing a shaft having a centrally formed cavity extending along a longitudinal axis of the shaft;
   substantially filling the cavity with a viscoelastic material along at least one or more longitudinal length segments of the shaft by introducing a plurality of reagents into said cavity by injecting and mixing said reagents within said cavity as a liquid or semi-liquid which react and fill the entirety of said shaft cavity with a foamed elastic material that is bonded to an internal surface of said cavity; and,
   allowing the viscoelastic material to rest and adhere to said internal surface of the cavity along the one or more longitudinal length segments of the shaft,
   wherein mixing of said reagents immediately forms a network of vibration attenuating elastic dampeners which are directly bonded onto said internal surface of said shaft and are configured to attenuate a propagation of vibrational energy through the shaft.

2. The method of claim 1, further comprising substantially filling the cavity with the viscoelastic material along a total longitudinal length of the shaft.

3. The method of claim 1, further comprising at least one of said one or more longitudinal length segments of said shaft is empty.

4. A method of making a golf club shaft comprising the steps of:
   providing a shaft having a centrally formed cavity extending along a longitudinal axis of the shaft;
   substantially filling the cavity with a viscoelastic material along at least one or more longitudinal length segments of the shaft by introducing a plurality of reagents into said cavity by injecting and mixing said reagents within said cavity as a liquid or semi-liquid which react and fill the entirety of said shaft cavity with a foamed elastic material that is bonded to an internal surface of said cavity; and, allowing the viscoelastic material to rest and adhere to the internal surface of the cavity along the one or more longitudinal length segments of the shaft, wherein no adhesive member is added to provide adhesion;

and wherein mixing of said reagents immediately forms a network of vibration attenuating elastic dampeners which are directly bonded onto an internal surface of said shaft and are configured to attenuate a propagation of vibrational energy through the shaft.

5. The method of claim 4, further comprising at least one of said one or more longitudinal length segments of said shaft is empty.

\* \* \* \* \*